United States Patent [19]

Ruff et al.

[11] Patent Number: 5,376,165
[45] Date of Patent: Dec. 27, 1994

[54] METHOD FOR THE TREATMENT OF GASES, ELLIPSOIDAL PACKING AND ITS USE

[75] Inventors: Wolfram Ruff, Hammah, Germany; Howard P. Davis, Petersham, England

[73] Assignee: Vereinigte Aluminium-Werke A.G., Bonn, Germany

[21] Appl. No.: 76,481

[22] Filed: Jun. 14, 1993

Related U.S. Application Data

[63] Continuation of Ser. No. 767,043, Aug. 2, 1991, abandoned.

[51] Int. Cl.$^5$ .................. B01D 47/14; B01D 53/14
[52] U.S. Cl. ................................. 95/212; 95/231; 95/232; 95/233; 95/235; 95/236
[58] Field of Search ............... 55/91, 233; 261/94–98, 261/DIG. 72; 95/211, 212, 1, 23, 231–233, 235, 236

[56] References Cited

U.S. PATENT DOCUMENTS

| | | | |
|---|---|---|---|
| 2,212,932 | 8/1940 | Fairlie | 261/94 |
| 3,122,594 | 2/1964 | Kielback | 55/91 |
| 3,350,075 | 10/1967 | Douglas | 261/DIG. 72 |
| 3,364,656 | 1/1968 | Whiton et al. | 261/DIG. 72 |

(List continued on next page.)

FOREIGN PATENT DOCUMENTS

| | | |
|---|---|---|
| 2269993 | 12/1975 | France . |
| 846093 | 7/1952 | Germany . |
| 1085662 | 7/1960 | Germany . |
| 1226077 | 10/1966 | Germany . |
| 1544161 | 6/1970 | Germany . |
| 7227930 | 7/1972 | Germany . |
| 2447942 | 7/1979 | Germany . |
| 3024228 | 1/1982 | Germany . |

(List continued on next page.)

OTHER PUBLICATIONS

Tab A—Letter from Tribe to Müller-Wolff, dated Mar. 2, 1993.
Tab B—Letter from Tribe to Ludwig, dated Mar. 17, 1993.
Tab 1—Davis Declaration—Letter from Tribe to Moss, dated Mar. 1, 1993.
Tab 2—Davis Declaration—Purchase Order Number 9-DH-08825 from Dakota Gasification.
Tab 3—Davis Declaration—Euro-Matic Ltd. Invoice WO4136, Dakota Gasification.
Tab 4—Davis Declaration—Euro-Matic Ltd. Invoice WO2637, Nekoosa Paper.

(List continued on next page.)

*Primary Examiner*—Robert Spitzer
*Attorney, Agent, or Firm*—Darby & Darby

[57] ABSTRACT

A method for treating a gas stream to remove heat, gaseous, liquid or particulate matter, or add heat, vapor, or moisture, which includes the steps of:
  providing a tower having a bed with fluidizable hollow ellipsoidal packing with a long semi-axis and a short semi-axis;
  introducing a liquid stream into the tower at a liquid flow rate L, and countercurrently introducing the gas stream into the tower at a gas flow rate G sufficient to maintain the bed in a fluidized state and a gas velocity v; and
  adjusting the volume ratio of the liquid flow to gas flow to cause the ellipsoidal packing to circulate predominantly in the vertical direction relative to the long semi-axis and to maintain a pressure gradient $\Delta P/H_o$ across the depth of the fluidized bed of at least about 1500 Pa/m, and, simultaneously, to satisfy the equation:

$$L/G = K_1(\Delta P/H_o v) + K_2$$

wherein L/G is the volume ratio of liquid to gas; $\Delta P$ is the pressure drop across the bed; $H_o$ is the bed height in a state of rest; v is the gas velocity; and $K_1$ and $K_2$ are constants.

12 Claims, 7 Drawing Sheets

U.S. PATENT DOCUMENTS

| | | |
|---|---|---|
| 3,438,614 | 4/1969 | Lipinski .................................. 261/98 |
| 3,768,234 | 10/1973 | Hardison ................................. 55/91 |
| 3,911,066 | 10/1975 | Ireland, Jr. et al. ................... 261/94 |

FOREIGN PATENT DOCUMENTS

| | | |
|---|---|---|
| 3244921 | 6/1984 | Germany . |
| 3613151 | 10/1987 | Germany . |
| 1178502 | 1/1970 | United Kingdom ....... 261/DIG. 72 |
| 1488834 | 10/1977 | United Kingdom . |
| 0865360 | 9/1981 | U.S.S.R. ..................... 261/DIG. 72 |
| 1041856 | 9/1983 | U.S.S.R. ..................... 261/DIG. 72 |
| 1526786 | 12/1989 | U.S.S.R. ..................... 261/DIG. 72 |

OTHER PUBLICATIONS

Tab 5—Davis Declaration—Pollution Engineering Magazine, Feb. 1990, p. 64.
Tab 6—Davis Declaration—Letter from Berube, re advertisement in Pollution Engineering Magazine.
Tab 7—Davis Declaration—Euro-Matic Ltd. Sales Brochure.
Tab 8—Davis Declaration—Euro-Matic Ltd. Invoice WO4104, ARI Technology.
Tab 9—Davis Declaration—ARI Technology Order No. L 932, Jan. 2, 1990.
Tab 10—Davis Declaration—Purchase Order No. 65888 from Reynolds Metals.
Tab 11—Davis Declaration—Euro-Matic Ltd. Invoice WO6185 to Reynolds Metals.
Tab 12—Davis Declaration—Euro-Matic Ltd. Invoice WO6217 to SE Technologies.
Tab 13—Davis Declaration—Purchase Order No. FR-022-I from SE Technologies.
Tab 14—Davis Declaration—Euro-Matic Ltd. Invoice WO6009 Superior Environmental.
Tab 15—Davis Declaration—Morgan Grampian plc Invoice 0372634 to Euro-Matic Ltd.
Tab 16—Davis Declaration—Morgan Grampian plc, Process Engineering information request.
Tab 17—Davis Declaration—Pudvan Publishing Invoice No. 0013803 to Euro-Matic Ltd.
Tab 18—Davis Declaration—Letter from Davis to Gambos, dated Apr. 5, 1989.
Tab 19—Davis Declaration—Letter from Davis to Baker, dated Jul. 27, 1989.
Tab 20—Davis Declaration—Davis report re Dakota Gasification, dated Sep. 1989.
Tab 21—Davis Declaration—Fax from Kuhn to Davis, dated Jun. 22, 1982.
Search Report for PCT/EP 90/02088.

Mass Transfer Coefficient for Ammonia System v Pressure Gradient at Liquid Throughput of 10dm³/min Mass Transfer Coefficient v Pressure Gradient for $H_2S$ System at Liquid Throughput of 10dm³/min

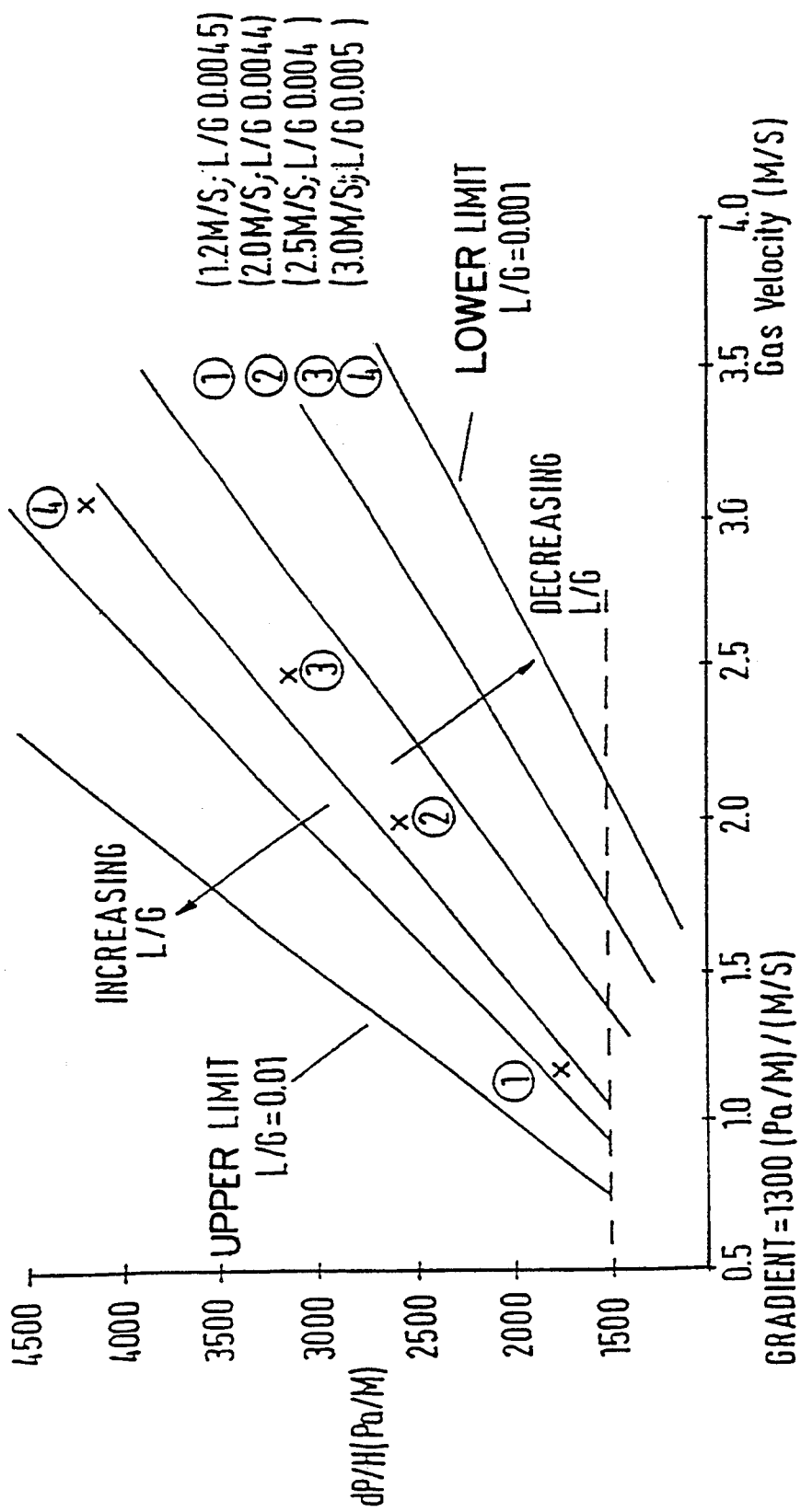

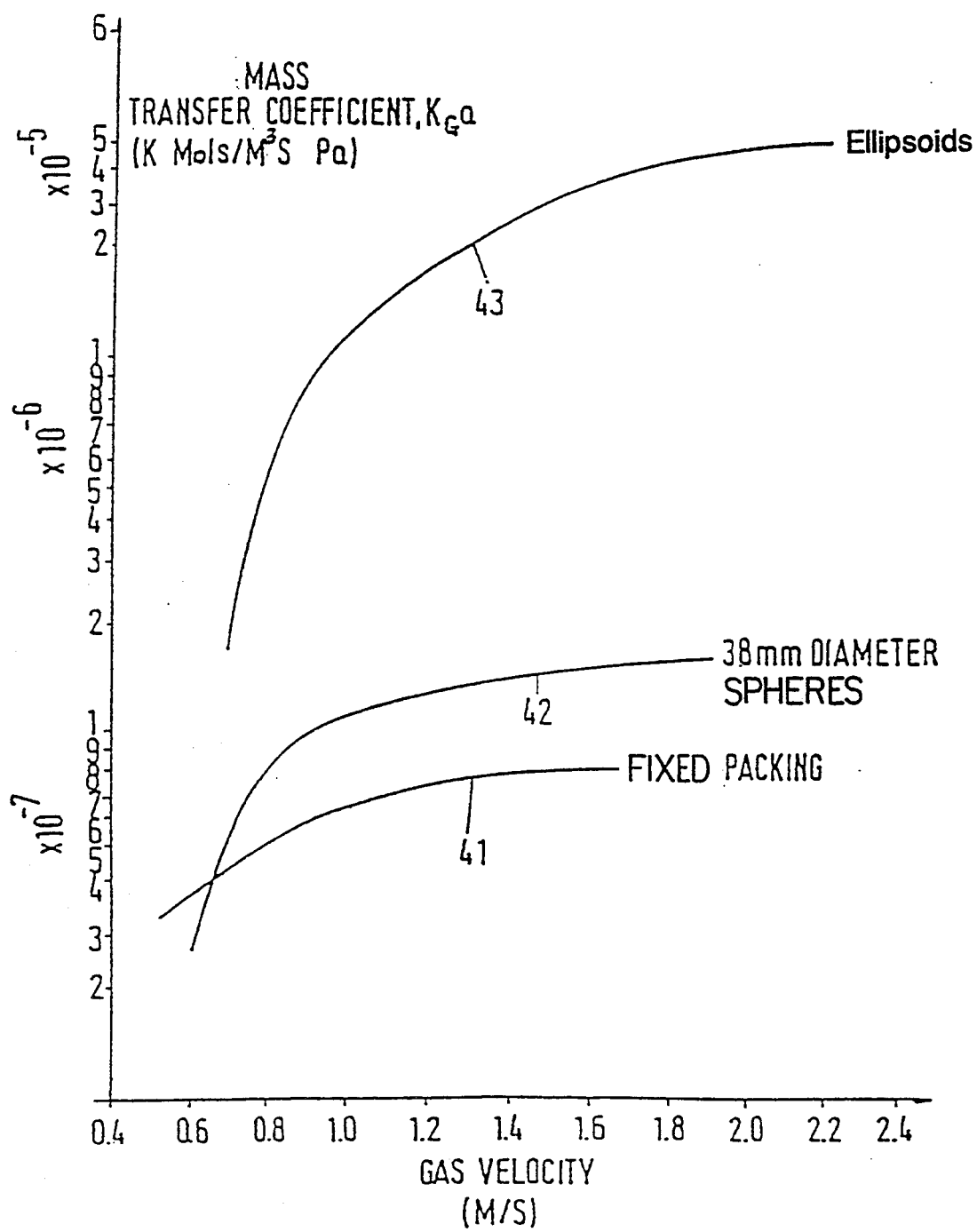

METHOD FOR THE TREATMENT OF GASES, ELLIPSOIDAL PACKING AND ITS USE

This is a continuation of application Ser. No. 07/767,043, filed Aug. 2, 1991, now abandoned.

FIELD OF INVENTION

The method relates to a method for scrubbing gases, particularly to a method for removing unwanted substances from gases by scrubbing them with a scrubbing liquid in a scrubbing tower.

BACKGROUND INFORMATION AND PRIOR ART

It is very important at the present time that the contamination of the environment by any method, whether it be a combustion process or a chemical method, be restricted to a minimum.

For many years, it was customary to purify the gases, which are formed during these processes, in a scrubbing tower, in which the rising gases were scrubbed by being sprayed from above by means of water or a suitable solution. By these means, the pollutants in the gas were dissolved out or separated and concentrated in the scrubbing solution.

To support the scrubbing process, the towers were previously provided with a static packing, which has a large surface area relative to the gas and the water and contributes to washing out the unwanted particles and chemicals from the gas.

To be efficient, the scrubbing towers with stationary packing frequently must be very tall and contain a large amount of packing, so that the gases emerging from it has been purified to such a degree, that the pollutant content is safe for the environment.

To solve this problem, it was proposed that the packing be replaced by spherical column packing material, which is maintained in a fluidized state by the velocity of the gas that is to be purified.

The advantages of using these spheres, which consist of a chemical inert material such as polypropylene, lies therein that the spheres are rotating and moving constantly. For this reason, the particles, which are scrubbed out of the gas, do not adhere to the spheres and thus do not block the scrubbing process or increase the pressure drop.

However, the fluidized spheres have the disadvantage that the fluidizing gas tends to move the spheres from the center of the tower to the sides. As a result, a hole is left in the center of the tower and the gas can flow through this hole without being subjected to a scrubbing process other than the spraying with water or a different scrubbing liquid. If the gas flows through the spherical packing, turbulence develops, by means of which the scrubbing process is aided.

To solve this problem, it was proposed in the German patent 36 13 151 that ellipsoids be used in a fluidized bed scrubber instead of spheres.

The ellipsoids have a regular shape and a maximum and minimum diameter, the wall being thickened in the region of the larger diameter of the sphere. The ellipsoids are fluidized by the gas stream already at the low velocity of 1 m/sec. The individual ellipsoids carry out directed transverse motions within the individual bed and, at the same time, rotate about the short semiaxis. The use of hollow ellipsoids in gas scrubbers is particularly advantageous, because the film of liquid on the surface of the ellipsoid is frequently torn off by the accelerated rotary motion and the exchange of material is activated by the new formation of the film.

Rotation about its own axis produces a high circumferential velocity in the plane of the long semiaxis. This leads to a directed flow of the scrubbing liquid on the contact surface with intensive distribution from the edge to adjacent contact elements. On the whole, a new, chargeable phase boundary surface for material exchange is thus permanently offered and the absorption performance and the particle precipitation are thus improved.

OBJECTS OF THE INVENTION

It is an object of the present invention to improve further the described properties of ellipsoid packing and to provide an efficient method for scrubbing, by means of which almost all unwanted, generally harmful substances are removed.

SUMMARY OF THE INVENTION

The inventive method consists therein that the gas is introduced into a pipe with a bed of ellipsoids, the gas velocity, the amount of gas and the amount of liquid being so coordinated with one another, that the ellipsoids are fluidized and induced to carry out a tumbling motion. In this connection, it is of decisive importance that a pressure gradient of more than 1,500 Pa/m is achieved in the packing bed. A scrubbing liquid is passed in the form of droplets through the ellipsoid bed counter to the direction of flow of the gases, the scrubbing liquid constantly covering the surface of the ellipsoids in the bed in order to offer the gas a large surface area. The harmful substances or the substances to be separated are transferred from the gas to the scrubbing liquid and the latter, together with the separated substances, are collected for removal.

BRIEF DESCRIPTION OF THE DRAWINGS

FIG. 6 illustrates the proportionality between the pressure gradient and the gas velocity in the method of the present invention over a specified range of liquid to gas ratios; and FIG. 7 compares the relationship between the mass transfer coefficient and the gas velocity in $H_2S$ removal for the present invention to that of fixed bed and a fluidized bed with hollow spheres, respectively.

DETAILED DESCRIPTION OF THE INVENTION

The gas velocity is selected so that the ellipsoids are not carried out of the fluidized bed formed by the gas stream. Preferably, the gas velocity is 20% to 100% above the minimum velocity required for fluidization. Under the conditions selected, the ellipsoidal packing carries out a tumbling motion.

If the ratio of the radii (long axis to short axis) is selected correctly, the ellipsoidal packing in the fluidized state tumbles predominantly in the vertical position i.e. about the long semiaxis of the ellipsoid.

In the case of the present method, the ratio of the minimum radius to the maximum radius of the ellipsoid is between 0.3 and 0.9. A further preferred ratio lies between 0.5 and 0.8. In order to reduce their mass, the ellipsoids are preferably formed as hollow and not as solid bodies. Preferably, they consist of a chemically inert material, such as polypropylene.

It is advisable to keep the ellipsoids in individual cages provided with openings. This reduces the risk that the ellipsoids will be pulled along by the gas and carried out of the bed.

Pursuant to the invention, provisions are made so that the pressure gradient in the fluidized bed is more than 1,500 Pa/m. The pressure gradient is determined by the pressure drop in the fluidized bed scrubber and is identical with the pressure loss in the fluidized beds related to the packing height in the state of rest of the scrubber. For example, in the case of a multistep fluidized bed scrubber, the total pressure drop must be divided by the overall height of the packings (the sum of all the individual beds), the height of the packings being measured in the state of rest. If the pressure gradient in the fluidized bed is more than 1,500 Pa/m, a high mass transfer coefficient, a high heat transfer coefficient and good dust deposition are achieved pursuant to the invention. This is based on intensive interactions and good contact between the packings.

Basically, it is possible to maintain the volume ratio of the scrubbing liquid to gas, which is to be treated, between 0.001 to 0.01. At a gas velocity of more than 2.0 m/see, the packings are in a fluidized state, the packings carrying out a circulating motion in the space available in the fluidized bed scrubber. Moreover, it is not possible to assign a defined place to an individual packing.

In order to maximize the scrubbing effect of the liquid, it is possible to dispose several beds one above the other in the tower, so that the gas is passed consecutively through the fluidized beds. The method can also consist therein that the gas is exposed to different scrubbing liquids or solvents of different concentrations in the individual beds. The liquid, by means of which the gas is scrubbed, is collected preferably at the foot of the tower and processed, so that the concentrated impurities are separated or recovered, before the liquid is recycled to the scrubbing system.

Figure 1:
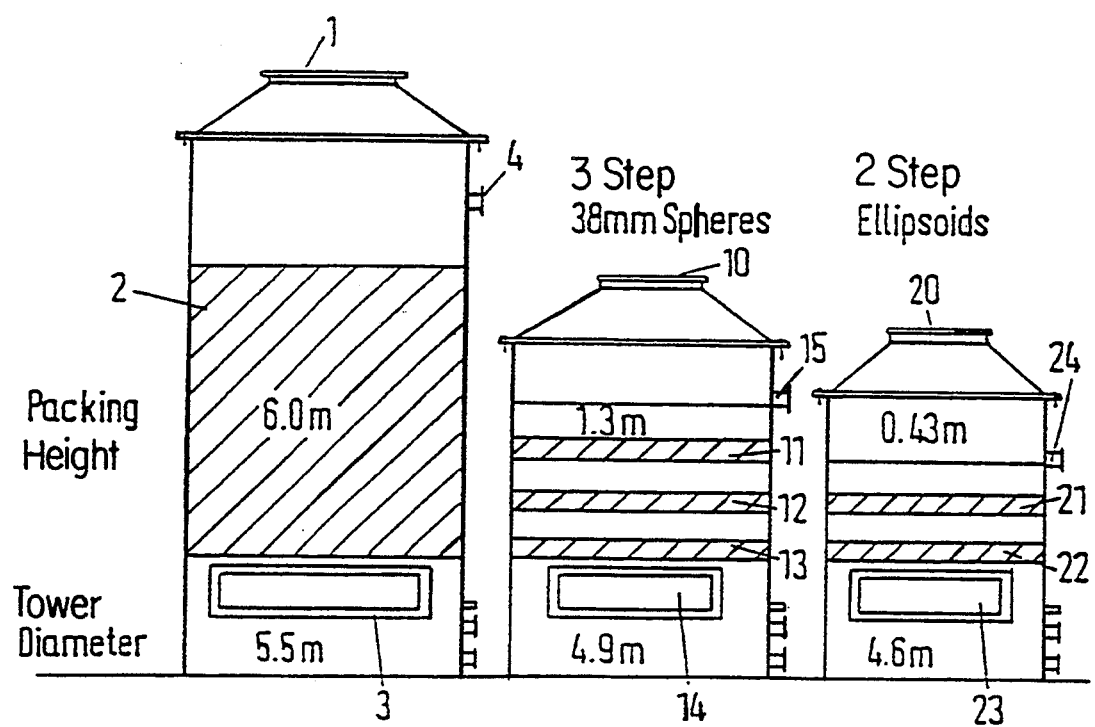
FIG. 1 is a comparison of a scrubbing tower utilizing the method of the present invention to scrubbing towers which utilize a fixed bed and a fluidized bed with hollow spheres, respectively.

For comparison purposes, the drawing (FIG. 1) shows two towers of the state of the art and one tower, in which ellipsoids are used and the inventive method is used.

The first tower 1 is provided with a fixed packing 2 to a height of 6 m. The fixed packing consists of 50 mm tings. The diameter of the tower is 5.5 m. A gas, which is to be purified, is fed in at the bottom of the tower through an opening 3 and a scrubbing liquid is fed in at the upper edge of the tower through an inlet opening 4.

The second tower 10 has three cleaning stages, which comprise the three beds 11, 12, and 13. The beds are equipped in each case with spheres with a diameter of 38 mm, which are held in individual boxes that are provided with openings. The boxes are disposed horizontally in the tower and the overall packing height of the three beds is 1.3 m. The diameter of the tower is 4.9 m. A gas, which is to be purified, is passed in through the opening 14 and a purifying liquid is introduced through pipe 15 at the upper edge of the tower and distributed through nozzles uniformly over the whole bed.

The third tower 20 has only a two-step cleaning element with the beds 21 and 22. These beds are filled with ellipsoids with a minimum diameter of 38 mm and a maximum diameter of 50 mm. The height of the individual beds in the state of rest is 0.43 m. The tower has a diameter of 4.6 m. The gas, which is to be purified, is passed in through the inlet opening 23 and the purifying liquid is fed in at 24 and distributed uniformly through nozzles over the packing bed.

Surprisingly, all towers, 1, 10 and 20, are able to purify the same amount of gas at the appropriate gas velocity. In a particular example, 100,000 $m^3$ of gas were purified per hour. The gas was passed in through the appropriate inlet openings 3, 14 and 23 and the appropriate scrubbing liquid was fed into the respective inlet openings 4, 15 and 24. The scrubbing liquid was sprayed there in the form of droplets by means of nozzles onto the individual beds, the gas velocity in towers 10 and 20 being selected, so that the elements of the bed, that is, the spheres and the ellipsoids, were maintained in a fluidized state within the boxes.

As the water enters the beds of the scrubbing towers, a thin film of liquid is formed on the packing, as a result of which a large exchange surface between the gas and liquid is formed. It was possible to wash the gas and remove the $H_2S$. The latter was dissolved in water with the addition of a suitable oxidizing agent.

TABLE I

Table I shows the efficiency of various towers.

|  | Fixed Packing Tower 1 | 38 mm Spheres Tower 10 | Ellipsoids Tower 20 |
| --- | --- | --- | --- |
| Efficiency % | 99.3% | 99.3% | 99.99% |
| Pressure Drop Pa | 1,800 | 2,050 | 1,800 |
| Pressure Gradient Pa/m | 300 | 1,577 | 4,100 |
| Gas Velocity m/s | 1.2 | 1.5 | 1.7 |
| Packing Height m | 6.0 | 1.3 | 0.43 |
| Bed Volume $m^3$ | 142 | 24.5 | 7.1 |
| Tower diam. m | 5.5 | 4.9 | 4.6 |

Table I shows that the efficiency of tower 20, in which ellipsoids are used, is almost 100% for purifying gases and is higher than that of towers 1 and 10. To achieve this higher efficiency, a compact tower is required and, as the numbers show, less packing. The task of the packing in tower 20 consists of making possible a significantly higher velocity of the gas that is to be treated. This means that the operating and capital costs are less than in the case of towers 1 and 10, in which a static or spherical packing was used. The method of the present invention therefore offers appreciable advantages over the known state of the art.

If the data given in Table II is taken into consideration, the increase in the efficiency becomes clear.

TABLE II

| Fluidizing Element | Weight g | Effective Surface Area m²/m³ | Number Example | Approximate Minimum Fluidization Velocity |
| --- | --- | --- | --- | --- |
| 38 mm spheres | 4.5 | 102 | 553,000 | 1.14 |
| 38 mm spheres | 6.0 | 102 | 553,000 | 1.31 |
| 50 mm spheres | 8.0 | 78 | 245,000 | 1.15 |
| 50 mm spheres | 10.0 | 78 | 245,000 | 1.29 |
| ellipsoid | 8.0 | 80 | 86,000 | 1.0 |
| 38/50 mm | 7.0 | 80 | 86,000 | 1.0 |

Table II shows that a much smaller minimum fluidization velocity is required for the typical application when ellipsoids are used than when the other different sizes are used. Moreover, the ellipsoids have a sufficiently large, effective surface area at a relatively low weight and with a small number of elements. It is remarkable that, on the wetted ellipsoid, there is a very intimate mixing of the gas with the liquid film, which flows over the ellipsoid. Because of this mixing of the gas and the liquid, a maximum contact surface is formed and the separation is a maximum.

The ellipsoids themselves constantly change their orientation relative to the flow of the gas stream and join together in various regions.

Because of their shape, they do not tend to be forced to the sides of the bed, as is the case with spheres. This means that the largest mass transfer co-efficient is achieved. As an example of this, Table III shows the adsorption of $H_2S$ in an iron chelate solvent at different gas velocities.

TABLE III $H_2S$ Absorption in $Fe^{3+}$ nitrilo acetic acid in a cylindrical, turbulent absorber with a diameter of 60 cm.

TABLE IIIA

Liquid Velocity: 0.000589 m/sec (10.0 dm³/min)
Packing: 37.5 mm hollow spheres

| Gas Velocity m/sec | Mass Transfer Coefficient Kg moles/m³/sec/Pa |
| --- | --- |
| 0.9 | $1.4 \times 10^{-7}$ |
| 0.9 | $1.9 \times 10^{-7}$ |
| 1.1 | $2.6 \times 10^{-7}$ |
| 1.2 | $2.7 \times 10^{-7}$ |
| 1.4 | $2.8 \times 10^{-7}$ |
| 1.5 | $2.9 \times 10^{-7}$ |
| 1.7 | $2.9 \times 10^{-7}$ |

TABLE IIIB

Liquid Velocity: 0.000590 m/sec (10.0 dm³/min)
Packing: 48 mm × 35 mm ellipsoids

| Gas Velocity m/sec | Mass Transfer Coefficient kg moles/m³/sec/Pa |
| --- | --- |
| 0.702 | $34.0 \times 10^{-7}$ |
| 1.16 | $220.79 \times 10^{-7}$ |
| 2.3 | $493.0 \times 10^{-7}$ |

The experiments show that, for comparable gas velocities, the mass transfer coefficient is almost 100 times higher than that for hollow spheres. At still higher gas velocities, which are not achievable with hollow spheres, the mass transfer coefficient is almost 200 times as high.

This shows that the use of the present invention offers a method for operating a scrubbing tower, which is significantly more efficient and less expensive than the previously available methods. The ellipsoids, which are now available under the trademark of "Scrubber-fill", may deviate from the dimensions and weights, which are given in the examples. The preferred ratio of the minimum to the maximum diameter is, however, between 0.5 and 0.8 or most preferably 0.7 to 0.8.

EXAMPLE 1

The Removal of Particulate Impurities from Gases (Dust Deposition)

The height of the packing was 0.28 m and the quantitative ratio of liquid to gas fell within the range of 0.003 to 0.004. More than 70% of the particulate impurities with a particle size of more than 1 μm were precipitated from the gas with the scrubbing liquid.

At a packing height of 0.28 m and a quantitative ratio of liquid to gas of between 0.003 and 0.04, 40% or more of the particulate impurities contained in the gas and having a particle size of less than 1 μm were precipitated with the scrubbing liquid.

EXAMPLE 2

In a scrubber with a diameter of 1 m and a bed height of 0.3 m, the heat transfer coefficient was determined at a gas flow rate of 3 m/sec and a ratio by volume of liquid to gas of 0.005. The number of the packings was 3,000. For the heat exchange between air with 6% $SO_2$ and water, the heat transfer coefficient was 645,354 kcal/m³/hour/°C. It was therefore higher by a factor of 150 than the heat transfer coefficient of a fixed packing of Pall rings with a diameter of 2 inches. The pressure gradient was 4,230 Pa/m

EXAMPLE 3

An HF-containing, dust laden waste gas from the aluminum fusion electrolysis was treated by the inventive method with water under the following operating parameters:

| | |
| --- | --- |
| cross section of the scrubber | 7 m × 4 mm = 28 m² |
| bed height in the state of rest | 0.28 m |
| number of steps (beds) | 4 |
| pressure drop | 820 Pa |
| packing dimensions | 38/50 mm |
| packing number per bed | 21,000 Scrubberfills |
| gas velocity | 2.2 m/sec |
| volume ratio of liquid to gas L:G | 0.004–0.006 = 4–5 dm³/m³ |
| pressure gradient | approx. 2940 Pa/m |

Operating results

HF: crude gas: 40 mg/m³ purified gas: 0.4 mg/m³
collection efficiency: 99% dust: crude gas: 200 mg/m³ purified gas: 28 mg/m³
collection efficiency: 86%

Under these conditions, there is a pressure gradient of about 3,000 Pa/m. The efficiency of the HF absorption in this case is about 99%, the precipitated dust portion being about 86%.

EXAMPLE 4

In this example, an $NH_3$-containing waste gas is treated by the inventive method with water at the following experimental parameters.

| | |
| --- | --- |
| bed diameter | 0.6 m |
| bed height at state of rest | 0.16 m |
| packing dimensions | 50 × 38 mm |
| number of packings | 500 packings |
| liquid throughput | 10 dm³/min |

-continued

| volume ratio of gas to liquid | 0.001–0.004 |

Figure 2:
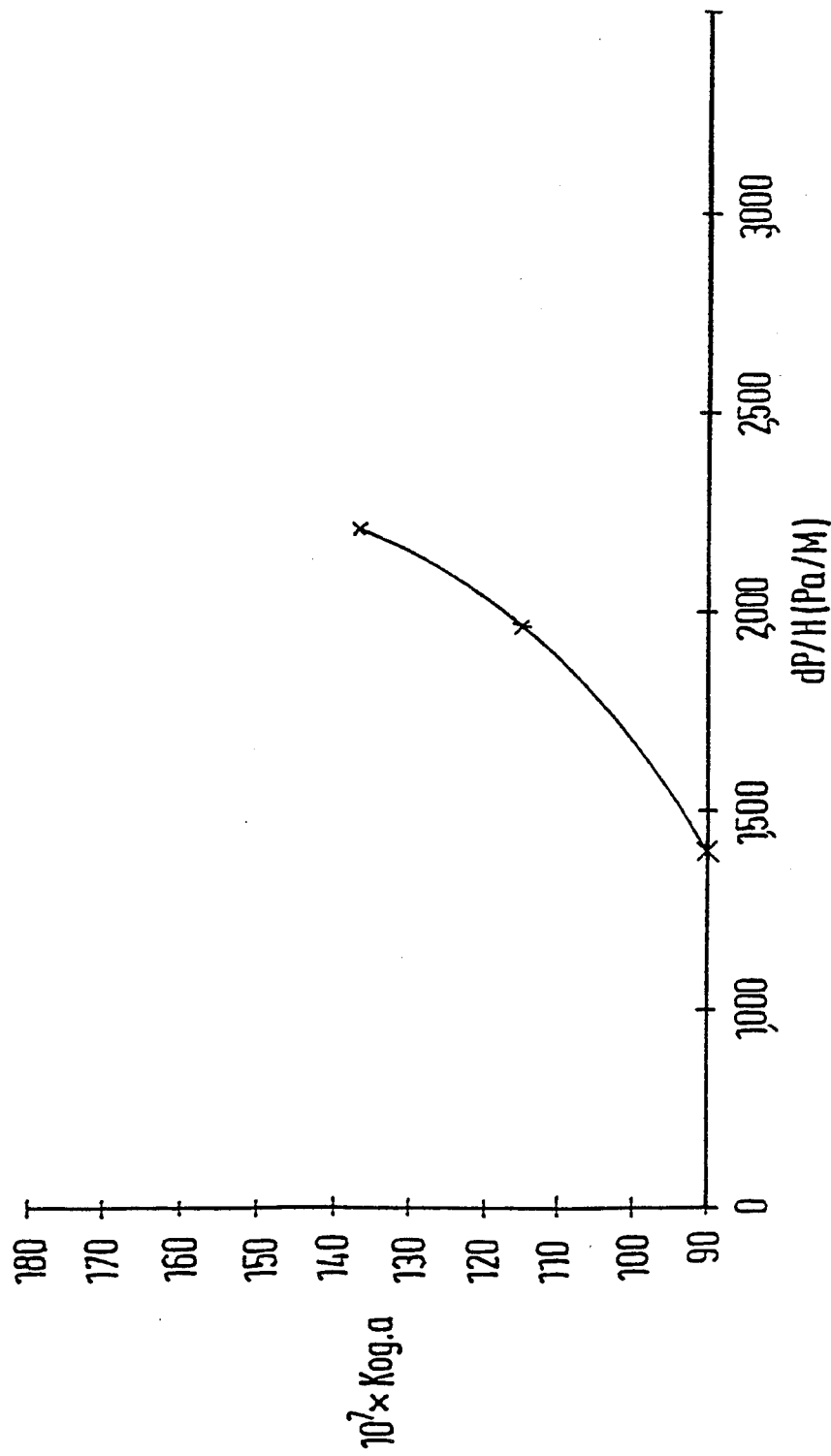
FIG. 2 illustrates the relationship between the mass transfer coefficient and the pressure gradient in the method of the present invention for the treatment of waste gas containing $NH_3$ in Example 4.

The mass transfer coefficient for the adsorption of $NH_3$ in water was determined at different pressure gradients. FIG. 2 shows the relationship between the mass transfer coefficient and the pressure gradient. Above a pressure gradient of 1,500 Pa/m, the mass transfer coefficients are very high and lead to an increase in the absorption yield.

EXAMPLE 5

An $H_2S$-containing synthesis gas was treated with a Sulphanol solution according to the inventive method with the following experimental parameters:

| | |
|---|---|
| cross section of the scrubber | 1 m |
| bed height in the state of rest | 0.5 m |
| number of stages | 2 |
| packing dimensions | 50 × 38 mm |
| nubmer of packings per step | 1500 |
| gas velocity | 0.6–2.1 m/sec |
| volume ratio of liquid to gas | 0.0025–0.008 |

Figure 3:
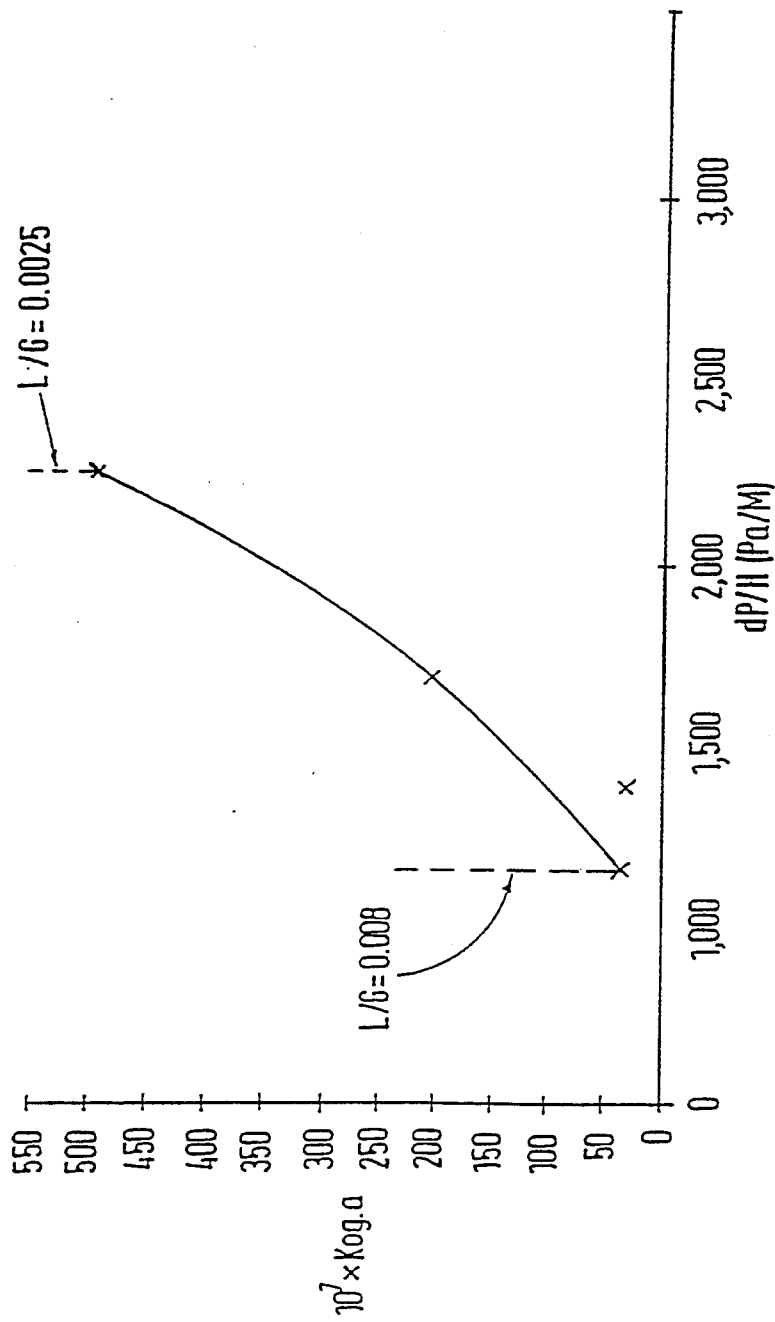
FIG. 3 illustrates the relationship between the mass transfer coefficient and the pressure gradient in the method of the present invention for the treatment of waste gas containing $H_2S$ in Example 5.
Figure 4:
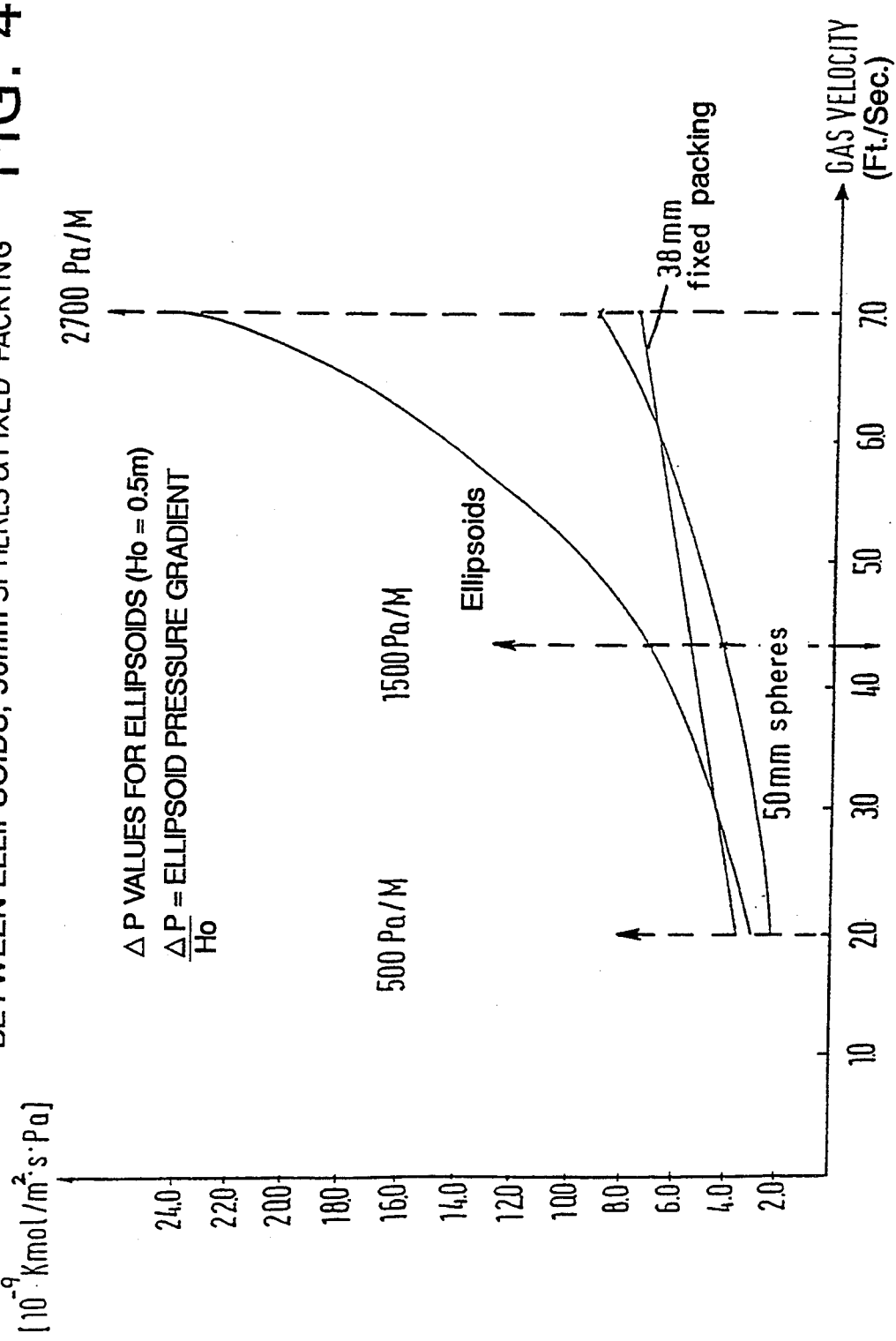
FIG. 4 compares the relationship between the mass transfer coefficient and the gas velocity for the present invention to that of conventional fixed beds and a fluidized bed with hollow spheres, respectively.

FIG. 3 shows the relationship determined in this example between the mass transfer coefficient and the pressure gradient for a constant flow rate of 10 $dm^3$/min. Above a pressure gradient of about 1,500 Pa/m, the mass transfer coefficient increases steeply. At the same time, the volume ratio of liquid to gas (L/G) falls from 0.008 to 0.0025 because the liquid throughput is constant, while the gas velocity is increasing. In comparison to this example, similar experiments were carried out with a static packing and a fluidized bed with hollow spheres (diameter of 20 inches). FIG. 4 compares the relationships between the mass transfer coefficient and the gas velocity for the different methods. The mass transfer coefficients in a scrubber with the ellipsoid packing employed in the inventive method at higher gas velocities are therefore clearly higher than those for fixed packings and fluidized beds with hollow spheres. Above a pressure gradient of about 1,500 Pa/m, corresponding to a gas velocity in this application case of about 1.3 m/sec, the mass transfer coefficient for ellipsoid packings increases super-proportionally in comparison with the other two packings.

Figure 5:
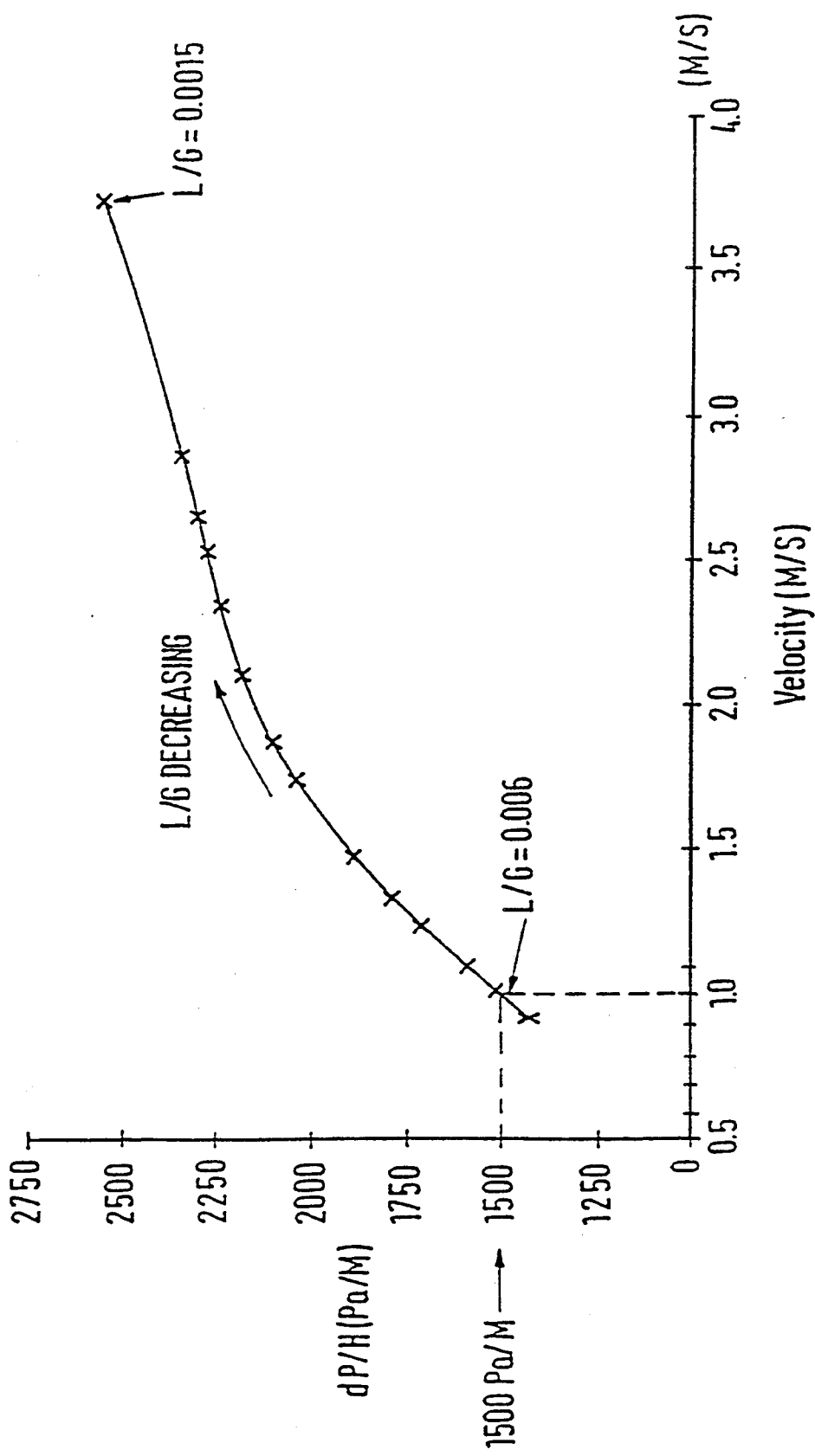
FIG. 5 illustrates the relationship between pressure gradient and flow velocity in the method of the present invention at a constant water amount of 10 $dm^3$/min.

FIG. 5 shows the relationship between pressure gradient and flow velocity at a constant amount of water of 10 $dm^3$/min. The conditions, under which the ellipsoidal packing changes over to the fluidized state, are shown at the lower end of the curve. As the gas velocity increases, the liquid to gas ratio drops from 0.006 to 0.0015.

FIG. 6 reveals a proportionality between the pressure gradient and the gas velocity for different liquid to gas ratios. The pressure gradient increases or decreases as the liquid to gas ratio increases or decreases. Preferably, the liquid to gas ratio is 0.001 to 0.01; in FIG. 6, the region between 0.004 and 0.005 is shown.

FIG. 7 compares the relationship between the mass transfer coefficient and the gas velocity in $H_2S$ removal for the present invention to that of fixed bed and a fluidized bed with hollow spheres, respectively.

We claim:

1. A method for treating a gas stream to remove one or more of heat or gaseous, liquid or particulate constituents of said stream or to add heat, vapor or moisture to said stream, the method comprising the steps of:
   providing a tower having a bed comprising fluidizable hollow ellipsoidal packing having a long semi-axis and a short semi-axis;
   introducing a liquid stream into said tower, said liquid in said stream having a liquid flow L;
   countercurrently introducing said gas stream into said tower, said gas stream having a gas flow G sufficient to maintain said bed in a fluidized state and a gas velocity v;
   adjusting the volume ratio of said liquid flow to said gas flow (L/G) to cause said ellipsoidal packing to be in a fluidized state and to circulate predominantly in the vertical direction relative to the long semi-axis and to maintain a pressure gradient $\Delta P/H_o$ across the depth of said fluidized bed of at least about 1500 Pa/m, and, simultaneously, to satisfy the equation:

$$L/G = K_1(\Delta P/H_o v) + K_2$$

wherein
   $\Delta P$ is the pressure drop across the bed;
   $H_o$ is the bed height in a state of rest;
   v is the gas velocity; and
   $K_1$ and $K_2$ are numerical constants.

2. The method of claim 1 wherein the volume ratio of said liquid flow to said gas flow, L/G, ranges from 0.001 to 0.01.

3. The method of claim 1 wherein the equation reads as follows:

$$\Delta P/H_o v = 4.77 + 1.8(L/G)$$

wherein $\Delta P$ is in cm; $H_o$ is in m; v is in m/sec; and L/G is the ratio of liquid to gas in $dm^3/m^3$.

4. The method of claim 1 wherein the ratio of the pressure gradient to the gas velocity is about 730 Pa/m/m/sec for a ratio of liquid to gas of between 0.001 and 0.002.

5. The method of claim 1 wherein the gas velocity is set at least at 1.75 m/sec in order to achieve a fluidized state and the fluidized state sets in at about 1,300 Pa/m, for an L/G of 0.001.

6. The method of claim 1 wherein said fluidized bed has a gas velocity of 1.15 m/sec, an L/G of 0.004 to 0.005, and a pressure gradient of 1,500 Pa/m.

7. The method of claim 1 wherein the ratio of the pressure gradient to the gas velocity is 1,300 Pa/m/m/sec at a gas velocity of 1.15 m/sec and a liquid to gas ratio of 0.004 to 0.005.

8. The method of claim 1 wherein at least one of the following gaseous materials: $H_2S$, $Cl_2$, $SO_2$, HCl, HF, $NH_3$, $CO_2$, or water is removed from said gas stream.

9. The method of claim 1 wherein particulate impurities are removed from said gas stream, said method comprising an L/G of 0.001 to 0.003 for particle sizes greater than 1 μm and an L/G of 0.003 to 0.01 for particle sizes smaller than 1 μm.

10. The method of claim 1 wherein an exchange of heat takes place between said gas stream and said liquid stream, wherein for a diameter of the tower of at least 0.3 m and a gas flow rate of 1 to 4.5 m/sec, an L/G of 0.001 to 0.01 is employed.

11. The method of claim 1, wherein L/G ranges from 0.001 to 0.01.

12. The method of claim 1 wherein:
$\Delta P/H_o v = 1300$ Pa/$m^2$.s when L/G = 0.004 to 0.005.

* * * * *